US012506096B2

United States Patent
Heineck

(12) 
(10) Patent No.: US 12,506,096 B2
(45) Date of Patent: Dec. 23, 2025

(54) MICROELECTRONIC DEVICES, AND RELATED MEMORY DEVICES AND ELECTRONIC SYSTEMS

(71) Applicant: Micron Technology, Inc., Boise, ID (US)

(72) Inventor: Lars P. Heineck, Boise, ID (US)

(73) Assignee: Micron Technology, Inc., Boise, ID (US)

(*) Notice: Subject to any disclaimer, the term of this patent is extended or adjusted under 35 U.S.C. 154(b) by 533 days.

(21) Appl. No.: 17/929,997

(22) Filed: Sep. 6, 2022

(65) Prior Publication Data

US 2024/0079361 A1 Mar. 7, 2024

(51) Int. Cl.
| | | |
|---|---|---|
| H01L 23/00 | (2006.01) | |
| H01L 25/065 | (2023.01) | |
| H01L 25/18 | (2023.01) | |

(52) U.S. Cl.
CPC .......... *H01L 24/08* (2013.01); *H01L 25/0657* (2013.01); *H01L 25/18* (2013.01); *H01L 2224/08145* (2013.01); *H01L 2924/1431* (2013.01); *H01L 2924/14511* (2013.01)

(58) Field of Classification Search
None
See application file for complete search history.

(56) References Cited

U.S. PATENT DOCUMENTS

| | | |
|---|---|---|
| 7,372,091 B2 | 5/2008 | Leslie |
| 8,042,082 B2 | 10/2011 | Solomon |
| 8,958,228 B2 | 2/2015 | Samachisa et al. |

(Continued)

FOREIGN PATENT DOCUMENTS

| | | |
|---|---|---|
| JP | 2002-103299 A | 4/2002 |
| KR | 10-2009-0034570 A | 4/2009 |

(Continued)

OTHER PUBLICATIONS

Choe et al., YMTC is China's First Mass Producer of 3D NAND Flash Memory Chips, https://www.techinsights.com/blog/ymtc-chinas-first-mass-producer-3d-nand-flash-memory-chips, (Mar. 12, 2020), pages.

(Continued)

*Primary Examiner* — Hung K Vu
(74) *Attorney, Agent, or Firm* — TraskBritt

(57) ABSTRACT

A microelectronic device includes a memory array region, a control logic region overlying the memory array region, and a pad region overlying the control logic region. The memory array region includes a stack structure including vertically alternating conductive structures and insulating structures; vertically extending strings of memory cells within the stack structure; at least one source structure vertically underlying the stack structure and coupled to the vertically extending strings of memory cells; and digit line structures vertically overlying the stack structure and coupled to the vertically extending strings of memory cells. The control logic region includes control logic devices configured to effectuate control operations for the vertically extending strings of memory cells. The pad region includes conductive pad structures coupled to the control logic devices. Memory devices and electronic systems are also described.

25 Claims, 2 Drawing Sheets

(56) References Cited

U.S. PATENT DOCUMENTS

| | | |
|---|---|---|
| 9,515,083 B2 | 12/2016 | Lee et al. |
| 9,530,790 B1 | 12/2016 | Lu et al. |
| 9,653,617 B2 | 5/2017 | Zhou et al. |
| 9,887,195 B1 * | 2/2018 | Drab .................. H10D 84/85 |
| 10,354,980 B1 * | 7/2019 | Mushiga ............. H01L 23/5226 |
| 10,381,362 B1 | 8/2019 | Cui et al. |
| 10,665,580 B1 | 5/2020 | Hosoda et al. |
| 11,282,815 B2 | 3/2022 | Parekh et al. |
| 11,335,602 B2 | 5/2022 | Parekh |
| 11,380,669 B2 | 7/2022 | Parekh |
| 11,417,676 B2 | 8/2022 | Meotto et al. |
| 11,545,456 B2 | 1/2023 | Goda et al. |
| 11,563,018 B2 | 1/2023 | Parekh |
| 2003/0113669 A1 | 6/2003 | Cheng et al. |
| 2005/0265076 A1 | 12/2005 | Forbes |
| 2006/0076690 A1 | 4/2006 | Khandros et al. |
| 2007/0288702 A1 | 12/2007 | Roohparvar |
| 2009/0168482 A1 | 7/2009 | Park et al. |
| 2011/0159645 A1 | 6/2011 | Pekny |
| 2012/0161094 A1 | 6/2012 | Huo et al. |
| 2013/0130468 A1 | 5/2013 | Higashitani et al. |
| 2014/0124726 A1 | 5/2014 | Oh |
| 2014/0175637 A1 | 6/2014 | Stuber et al. |
| 2016/0104715 A1 | 4/2016 | Pachamuthu et al. |
| 2016/0268304 A1 | 9/2016 | Ikeda et al. |
| 2016/0343727 A1 | 11/2016 | Kim et al. |
| 2017/0148802 A1 | 5/2017 | Dorhout et al. |
| 2019/0043836 A1 | 2/2019 | Fastow et al. |
| 2019/0206861 A1 | 7/2019 | Beigel et al. |
| 2021/0074716 A1 * | 3/2021 | Lim .................. H10B 41/46 |
| 2021/0398847 A1 | 12/2021 | Parekh |
| 2021/0398897 A1 | 12/2021 | Parekh |
| 2021/0398945 A1 | 12/2021 | Parekh |
| 2022/0020736 A1 | 1/2022 | Yip et al. |
| 2022/0059560 A1 | 2/2022 | Parekh |
| 2022/0246681 A1 | 8/2022 | Parekh |

FOREIGN PATENT DOCUMENTS

| | | | |
|---|---|---|---|
| KR | 10-2014-0117062 A | 10/2014 | |
| KR | 10-2015-0085155 A | 7/2015 | |
| KR | 10-2020-0008606 A | 1/2020 | |
| KR | 10-2020-0037444 A | 4/2020 | |
| TW | 201946057 A | 12/2019 | |
| WO | 2008/063251 A2 | 5/2008 | |
| WO | WO-2020201865 A1 * | 10/2020 | ........... G11C 11/401 |

OTHER PUBLICATIONS

Li et al., Skybridge-3D-CMOS: A Fine-Grained 3D CMOS Integrated Circuit Technology, IEEE Transactions on Nanotechnology, vol. 16, No. 4, (Jul. 2017), pp. 639-652.

Ymtc, About Xtacking, Xtacking Enables Dram-Like High I/O Speed, www.ymtc.com/Index.php?s=/cms/cate/69.html, (Apr. 20, 2020), 3 pages.

Parekh et al., "Methods of Forming Microelectronic Devices, and Related Microelectronic Devices, Memory Devices, and Electronic Systems", Filed Oct. 13, 2021, U.S. Appl. No. 17/500,773, 70 pages.

* cited by examiner

MICROELECTRONIC DEVICES, AND RELATED MEMORY DEVICES AND ELECTRONIC SYSTEMS

TECHNICAL FIELD

The disclosure, in various embodiments, relates generally to the field of microelectronic device design and fabrication. More specifically, the disclosure relates to microelectronic devices including a control logic region overlying a memory array region, and to relative memory devices and electronic systems.

BACKGROUND

Microelectronic device designers often desire to increase the level of integration or density of features within a microelectronic device by reducing the dimensions of the individual features and by reducing the separation distance between neighboring features. In addition, microelectronic device designers often desire to design architectures that are not only compact, but offer performance advantages, as well as simplified designs.

One example of a microelectronic device is a memory device. Memory devices are generally provided as internal integrated circuits in computers or other electronic devices. There are many types of memory devices including, but not limited to, non-volatile memory devices (e.g., NAND Flash memory devices). One way of increasing memory density in non-volatile memory devices is to utilize vertical memory array (also referred to as a "three-dimensional (3D) memory array") architectures. A conventional vertical memory array includes vertical memory strings extending through openings in one or more decks (e.g., stack structures) including tiers of conductive structures and dielectric materials. Each vertical memory string may include at least one select device coupled in series to a serial combination of vertically stacked memory cells. Such a configuration permits a greater number of switching devices (e.g., transistors) to be located in a unit of die area (i.e., length and width of active surface consumed) by building the array upwards (e.g., vertically) on a die, as compared to structures with conventional planar (e.g., two-dimensional) arrangements of transistors.

Control logic devices within a base control logic structure underlying a memory array of a memory device (e.g., a non-volatile memory device) have been used to control operations (e.g., access operations, read operations, write operations) on the memory cells of the memory device. An assembly of the control logic devices may be provided in electrical communication with the memory cells of the memory array by way of routing and contact structures. However, processing conditions (e.g., temperatures, pressures, materials) for the formation of the memory array over the base control logic structure can limit the configurations and performance of the control logic devices within the base control logic structure. In addition, the quantities, dimensions, and arrangements of the different control logic devices employed within the base control logic structure can also undesirably impede reductions to the size (e.g., horizontal footprint) of a memory device, and/or improvements in the performance (e.g., faster memory cell ON/OFF speed, lower threshold switching voltage requirements, faster data transfer rates, lower power consumption) of the memory device.

DETAILED DESCRIPTION

Figure 1:
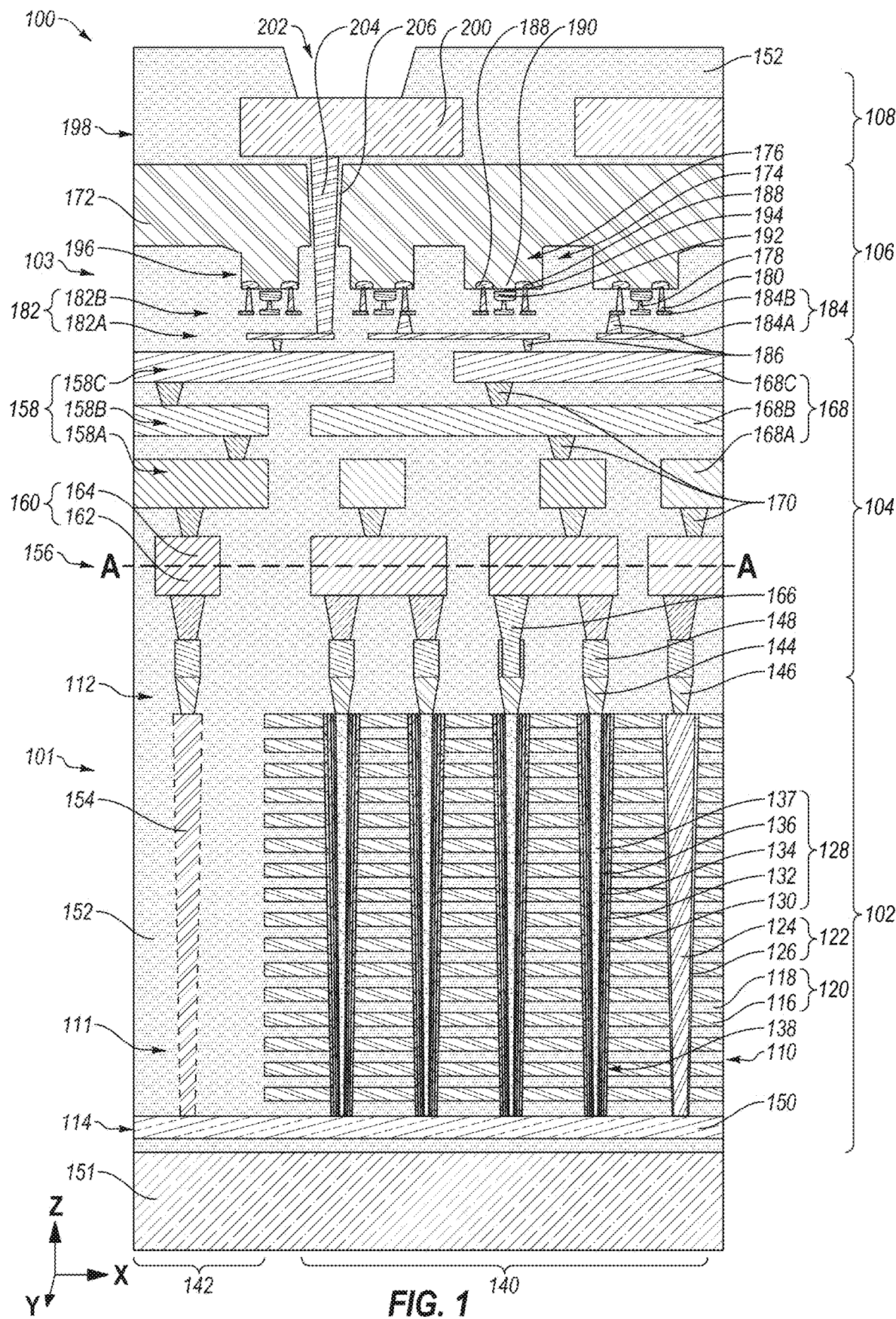
FIG. 1 is simplified, partial longitudinal cross-sectional view of a microelectronic device, in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional microelectronic device fabrication techniques employed in the industry. In addition, the description provided below does not form a complete process flow for manufacturing a microelectronic device (e.g., a memory device, such as 3D NAND Flash memory device). The structures described below do not form a complete microelectronic device. Only those process acts and structures necessary to understand the embodiments of the disclosure are described in detail below. Additional acts to form a complete microelectronic device from the structures may be performed by conventional fabrication techniques.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale. Additionally, elements common between figures may retain the same numerical designation.

As used herein, a "memory device" means and includes microelectronic devices exhibiting memory functionality, but not necessarily limited to memory functionality. Stated another way, and by way of non-limiting example only, the term "memory device" includes not only conventional memory (e.g., conventional volatile memory, such as conventional dynamic random access memory (DRAM); conventional non-volatile memory, such as conventional NAND memory), but also includes an application specific integrated circuit (ASIC) (e.g., a system on a chip (SoC)), a microelectronic device combining logic and memory, and a graphics processing unit (GPU) incorporating memory.

As used herein, the term "configured" refers to a size, shape, material composition, orientation, and arrangement of one or more of at least one structure and at least one apparatus facilitating operation of one or more of the structure and the apparatus in a pre-determined way.

As used herein, the terms "vertical," "longitudinal," "horizontal," and "lateral" are in reference to a major plane of a structure and are not necessarily defined by earth's gravitational field. A "horizontal" or "lateral" direction is a direction that is substantially parallel to the major plane of the structure, while a "vertical" or "longitudinal" direction is a direction that is substantially perpendicular to the major plane of the structure. The major plane of the structure is defined by a surface of the structure having a relatively large area compared to other surfaces of the structure. With reference to the figures, a "horizontal" or "lateral" direction may be perpendicular to an indicated "Z" axis, and may be parallel to an indicated "X" axis and/or parallel to an indicated "Y" axis; and a "vertical" or "longitudinal" direction may be parallel to an indicated "Z" axis, may be perpendicular to an indicated "X" axis, and may be perpendicular to an indicated "Y" axis.

As used herein, features (e.g., regions, structures, devices) described as "neighboring" one another means and includes features of the disclosed identity (or identities) that are located most proximate (e.g., closest to) one another. Additional features (e.g., additional regions, additional structures, additional devices) not matching the disclosed identity (or identities) of the "neighboring" features may be disposed between the "neighboring" features. Put another way, the "neighboring" features may be positioned directly adjacent one another, such that no other feature intervenes between the "neighboring" features; or the "neighboring" features may be positioned indirectly adjacent one another, such that at least one feature having an identity other than that associated with at least one the "neighboring" features is positioned between the "neighboring" features. Accordingly, features described as "vertically neighboring" one another means and includes features of the disclosed identity (or identities) that are located most vertically proximate (e.g., vertically closest to) one another. Moreover, features described as "horizontally neighboring" one another means and includes features of the disclosed identity (or identities) that are located most horizontally proximate (e.g., horizontally closest to) one another.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the phrase "coupled to" refers to structures operatively connected with each other, such as electrically connected through a direct Ohmic connection or through an indirect connection (e.g., by way of another structure).

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, "conductive material" means and includes electrically conductive material such as one or more of a metal (e.g., tungsten (W), titanium (Ti), molybdenum (Mo), niobium (Nb), vanadium (V), hafnium (Hf), tantalum (Ta), chromium (Cr), zirconium (Zr), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), aluminum (Al)), an alloy (e.g., a Co-based alloy, an Fe-based alloy, an Ni-based alloy, an Fe- and Ni-based alloy, a Co- and Ni-based alloy, an Fe- and Co-based alloy, a Co- and Ni- and Fe-based alloy, an Al-based alloy, a Cu-based alloy, a magnesium (Mg)-based alloy, a Ti-based alloy, a steel, a low-carbon steel, a stainless steel), a conductive metal-containing material (e.g., a conductive metal nitride, a conductive metal silicide, a conductive metal carbide, a conductive metal oxide), and a conductively-doped semiconductor material (e.g., conductively-doped polysilicon, conductively-doped germanium (Ge), conductively-doped silicon germanium (SiGe)). In addition, a "conductive structure" means and includes a structure formed of and including conductive material.

As used herein, "insulative material" means and includes electrically insulative material, such one or more of at least one dielectric oxide material (e.g., one or more of a silicon oxide ($SiO_x$), phosphosilicate glass, borosilicate glass, borophosphosilicate glass, fluorosilicate glass, an aluminum oxide ($AlO_x$), a hafnium oxide ($HfO_x$), a niobium oxide ($NbO_x$), a titanium oxide ($TiO_x$), a zirconium oxide ($ZrO_x$), a tantalum oxide ($TaO_x$), and a magnesium oxide ($MgO_x$)), at least one dielectric nitride material (e.g., a silicon nitride ($SiN_y$)), at least one dielectric oxynitride material (e.g., a silicon oxynitride ($SiO_xN_y$)), and at least one dielectric carboxynitride material (e.g., a silicon carboxynitride ($SiO_xC_zN_y$)). Formulae including one or more of "x," "y," and "z" herein (e.g., $SiO_x$, $AlO_x$, $HfO_x$, $NbO_x$, $TiO_x$, $SiN_y$, $SiO_xN_y$, $SiO_xC_zN_y$) represent a material that contains an average ratio of "x" atoms of one element, "y" atoms of another element, and "z" atoms of an additional element (if any) for every one atom of another element (e.g., Si, Al, Hf, Nb, Ti). As the formulae are representative of relative atomic ratios and not strict chemical structure, an insulative material may comprise one or more stoichiometric compounds and/or one or more non-stoichiometric compounds, and values of "x," "y," and "z" (if any) may be integers or may be non-integers. As used herein, the term "non-stoichiometric compound" means and includes a chemical compound with an elemental composition that cannot be represented by a ratio of well-defined natural numbers and is in violation of the law of definite proportions. In addition, an "insulative structure" means and includes a structure formed of and including insulative material.

As used herein, the term "semiconductor material" refers to a material having an electrical conductivity between those of insulative materials and conductive materials. For example, a semiconductor material may have an electrical conductivity of between about $10^{-8}$ Siemens per centimeter (S/cm) and about $10^4$ S/cm ($10^6$ S/m) at room temperature. Examples of semiconductor materials include elements found in column IV of the periodic table of elements such as silicon (Si), germanium (Ge), and carbon (C). Other examples of semiconductor materials include compound semiconductor materials such as binary compound semiconductor materials (e.g., gallium arsenide (GaAs)), ternary compound semiconductor materials (e.g., $Al_xGa_{1-x}As$), and quaternary compound semiconductor materials (e.g., $Ga_xIn_{1-x}As_yP_{1-y}$), without limitation. Compound semiconductor materials may include combinations of elements from columns III and V of the periodic table of elements (III-V semiconductor materials) or from columns II and VI of the periodic table of elements (II-VI semiconductor materials), without limitation. Further examples of semiconductor materials include oxide semiconductor materials such as zinc tin oxide ($Zn_xSn_yO$, commonly referred to as "ZTO"), indium zinc oxide ($In_xZn_yO$, commonly referred to as "IZO"), zinc oxide ($Zn_xO$), indium gallium zinc oxide ($In_xGa_yZn_zO$, commonly referred to as "IGZO"), indium gallium silicon oxide ($In_xGa_ySi_zO$, commonly referred to as "IGSO"), indium tungsten oxide ($In_xW_yO$, commonly referred to as "IWO"), indium oxide ($In_xO$), tin oxide ($Sn_xO$), titanium oxide ($Ti_xO$), zinc oxide nitride ($Zn_xON_z$), magnesium zinc oxide ($Mg_xZn_yO$), zirconium indium zinc oxide ($Zr_xIn_yZn_zO$), hafnium indium zinc oxide ($Hf_x$-$In_yZn_zO$), tin indium zinc oxide ($Sn_xIn_yZn_zO$), aluminum tin indium zinc oxide ($Al_xSn_yIn_zZn_aO$), silicon indium zinc oxide ($Si_xIn_yZn_zO$), aluminum zinc tin oxide ($Al_xZn_ySn_zO$), gallium zinc tin oxide ($Ga_xZn_ySn_zO$), zirconium zinc tin oxide ($Zr_xZn_ySn_zO$), and other similar materials.

As used herein, the term "homogeneous" means relative amounts of elements included in a feature (e.g., a material, a structure) do not vary throughout different portions (e.g., different horizontal portions, different vertical portions) of the feature. Conversely, as used herein, the term "heterogeneous" means relative amounts of elements included in a feature (e.g., a material, a structure) vary throughout different portions of the feature. If a feature is heterogeneous, amounts of one or more elements included in the feature may vary stepwise (e.g., change abruptly), or may vary continuously (e.g., change progressively, such as linearly, parabolically) throughout different portions of the feature. The feature may, for example, be formed of and include a stack of at least two different materials.

Unless the context indicates otherwise, the materials described herein may be formed by any suitable technique including, but not limited to, spin coating, blanket coating, chemical vapor deposition (CVD), plasma enhanced CVD (PECVD), atomic layer deposition (ALD), plasma enhanced ALD (PEALD), physical vapor deposition (PVD) (e.g., sputtering), or epitaxial growth. Depending on the specific material to be formed, the technique for depositing or growing the material may be selected by a person of ordinary skill in the art. In addition, unless the context indicates otherwise, removal of materials described herein may be accomplished by any suitable technique including, but not limited to, etching (e.g., dry etching, wet etching, vapor etching), ion milling, abrasive planarization (e.g., chemical-mechanical planarization (CMP)), or other known methods.

FIG. 1 is a simplified, partial longitudinal cross-sectional view of a microelectronic device 100 (e.g., a memory device, such as a 3D NAND Flash memory device), in accordance with embodiments of the disclosure. With the description provided below, it will be readily apparent to one of ordinary skill in the art that microelectronic devices described herein may be included in various relatively larger devices and various electronic systems.

Referring to FIG. 1, the microelectronic device 100 may include a memory array region 102, an interconnect region 104, a control logic region 106, and a pad region 108. As shown in FIG. 1, the interconnect region 104 may vertically overlie (e.g., in the Z-direction) and be in electrical communication with the memory array region 102, and the control logic region 106 may vertically overlie and be in electrical communication with the interconnect region 104. The interconnect region 104 may be vertically interposed between and in electrical communication with the memory array region 102 and the control logic region 106. In addition, the pad region 108 may vertically overlie and be in electrical communication with the control logic region 106. The control logic region 106 may be vertically interposed between and in electrical communication with the interconnect region 104 and the pad region 108.

As described in further detail below, the configuration of the microelectronic device 100, including the arrangement of the different regions (e.g., the memory array region 102, the interconnect region 104, the control logic region 106, the pad region 108) thereof, may facilitate enhanced signal transmission speed and improved signal integrity during use and operation of the microelectronic device 100 as compared to conventional microelectronic device configurations. For example, providing the pad region 108 (including the components thereof) directly vertically over the control logic region 106 may reduce routing distances and improve signal transmission speed (e.g., between pad structures within the pad region 108 and input/out circuitry within the control logic region 106) and signal integrity relative to conventional microelectronic device configurations where a memory array region is vertically interposed between a pad region and a control logic region (e.g., the memory array region vertically overlies the control logic region, and the pad region vertically overlies the memory array region).

The microelectronic device 100 may be formed, at least in part, from a microelectronic device structure 101 attached (e.g., bonded) to an additional microelectronic device structure 103. The microelectronic device structure 101 may include at least the memory array region 102 and a portion (e.g., lower portion) of the interconnect region 104. The additional microelectronic device structure 103 may include at least the control logic region 106 and an additional portion (e.g., upper portion) of the interconnect region 104. In some embodiments, the microelectronic device structure 101 comprises a first wafer (e.g., an array wafer), and the additional microelectronic device structure 103 comprises a second wafer (e.g., a control logic wafer). The microelectronic device structure 101 (including the components of the memory array region 102, and the portion of the interconnect region 104) and the additional microelectronic device structure 103 (including the components of the control logic region 106, and the additional portion of the interconnect region 104) may be formed separately from one another, and then may be attached to one another at an interface 156 depicted by way of a dashed line A-A in FIG. 1. The additional microelectronic device structure 103 may, for example, be bonded to the microelectronic device structure 101 through a combination of oxide-oxide bonding and metal-metal bonding, as described in further detail below. The additional microelectronic device structure 103 may be attached to the microelectronic device structure 101 without a bond line. Additional components of the microelectronic device 100, such as, without limitation, components of the pad region 108 and some components of the control logic region 106 may be formed subsequent to the attachment of the additional microelectronic device structure 103 to the microelectronic device structure 101, as also described in further detail below.

Still referring to FIG. 1, the memory array region 102 of the microelectronic device 100 may include a stack structure 110, a digit line tier 112 (e.g., a bit line tier, a data line tier), and a source tier 114. The stack structure 110 may be vertically interposed between the digit line structures 144 and the source tier 114. The digit line tier 112 may vertically overlie (e.g., in the Z-direction) the stack structure 110, and may include features (e.g., conductive structures, such as digit line structures and routing structures) coupled to additional features (e.g., pillar structures, filled vias) within the boundaries (e.g., vertical boundaries, horizontal boundaries) of stack structure 110 and further features (e.g., contact structures) within the boundaries (e.g., vertical boundaries, horizontal boundaries) of interconnect region 104 of the microelectronic device 100. The source tier 114 may vertically underlie (e.g., in the Z-direction) the stack structure 110, and may include other features (e.g., other conductive structures, such as source structure(s) and other routing structures) coupled to the additional features (e.g., pillar structures, filled vias) within the boundaries (e.g., vertical boundaries, horizontal boundaries) of the stack structure 110.

The stack structure 110 of the memory array region 102 includes a vertically alternating (e.g., in the Z-direction) sequence of conductive structures 116 and insulative structures 118 arranged in tiers 120. Each of the tiers 120 of the stack structure 110 may include at least one of the conductive structures 116 vertically neighboring at least one of the insulative structures 118. In some embodiments, the conductive structures 116 are formed of and include tungsten (W) and the insulative structures 118 are formed of and include silicon dioxide ($SiO_2$). The conductive structures 116 and insulative structures 118 of the tiers 120 of the stack structure 110 may each individually be substantially planar, and may each individually exhibit a desired thickness.

As shown in FIG. 1, deep contact structures 122 may horizontally overlap and vertically extend through the stack structure 110. The deep contact structures 122 may be configured and positioned to electrically connect one or more components of the microelectronic device 100 vertically overlying the stack structure 110 with one or more other components of the microelectronic device 100 vertically underlying the stack structure 110. The deep contact structures 122 may individually be formed of and include conductive material 124 and insulative liner material 126. The insulative liner material 126 may substantially continuously extend over and substantially cover side surfaces of the conductive material 124. The insulative liner material 126 may be horizontally interposed between the conductive material 124 and the conductive structures 116 of the tiers 120 of the stack structure 110, and may electrically isolate the conductive material 124 from the conductive structures 116 of the tiers 120 of the stack structure 110. In some embodiments, the conductive material 124 is formed of and includes W, and the insulative liner material 126 is formed of and includes at least one dielectric oxide material (e.g., $SiO_x$, such as $SiO_2$).

The memory array region 102 further includes cell pillar structures 128 horizontally overlapping and vertically extending through the stack structure 110. The cell pillar structures 128 may individually be formed of and include a stack of materials facilitating the use of the cell pillar structures 128 to form strings of memory cells 138 vertically extending through the stack structure 110. By way of non-limiting example, each of the cell pillar structures 128 may individually be formed to include a first dielectric oxide material 130 (e.g., $SiO_x$, such as $SiO_2$; $AlO_x$, such as $Al_2O_3$), a dielectric nitride material 132 (e.g., $SiN_y$, such as $Si_3N_4$), a second dielectric oxide material 134 (e.g., $SiO_x$, such as $SiO_2$), a semiconductor material 136 (e.g., Si, such as polycrystalline Si), and a dielectric fill material 137 (e.g., a dielectric oxide, a dielectric nitride, air). The first dielectric oxide material 130 may be located on or over surfaces (e.g., side surfaces) of the stack structure 110 of the microelectronic device 100. The dielectric nitride material 132 may be located on or over surfaces (e.g., inner side surfaces) of the first dielectric oxide material 130. The second dielectric oxide material 134 may be located on or over surfaces (e.g., inner side surfaces) of the dielectric nitride material 132. The semiconductor material 136 may be located on or over surfaces (e.g., inner side surfaces) of the second dielectric oxide material 134. The dielectric fill material 137 may be located on or over surfaces (e.g., inner side surfaces) of the semiconductor material 136.

Intersections of the cell pillar structures 128 and the conductive structures 116 of the tiers 120 of the stack structure 110 may define vertically extending strings of memory cells 138 coupled in series with one another within the memory array region 102 of the microelectronic device 100. In some embodiments, the memory cells 138 formed at the intersections of the conductive structures 116 and the cell pillar structures 128 within each the tiers 120 of the stack structure 110 comprise so-called "MONOS" (metal-oxide-nitride-oxide-semiconductor) memory cells. In additional embodiments, the memory cells 138 comprise so-called "TANOS" (tantalum nitride-aluminum oxide-nitride-oxide-semiconductor) memory cells, or so-called "BETANOS" (band/barrier engineered TANOS) memory cells, each of which are subsets of MONOS memory cells. In further embodiments, the memory cells comprise so-called "floating gate" memory cells including floating gates (e.g., metallic floating gates) as charge storage structures. The floating gates may horizontally intervene between central structures of the cell pillar structures 128 and the conductive structures 116 of the different tiers 120 of the stack structure 110.

As shown in FIG. 1, arrays of the cell pillar structures 128 (and, hence, arrays of the vertically extending strings of memory cells 138) within the memory array region 102 may at least partially define array sub-regions 140 and non-array sub-regions 142 of the memory array region 102. The non-array sub-regions 142 may horizontally neighbor the array sub-regions 140. The array sub-regions 140 may individually include an array of the cell pillar structures 128 within a horizontal area thereof. The non-array sub-regions 142 may individually be free of cell pillar structures 128 within a horizontal area thereof.

The digit line tier 112 overlying the stack structure 110 may include the digit line structures 144 (e.g., bit line structures, data line structures) and first conductive routing structures 146. The digit line structures 144 and the first conductive routing structures 146 may horizontally extend (e.g., in the X-direction, in the Y-direction) in desirable paths within the digit line tier 112. The digit line structures 144 may vertically overlie, horizontally overlap, and be coupled to the cell pillar structures 128. The first conductive routing structures 146 may vertically overlie, horizontally overlap, and be coupled to additional features (e.g., structures, materials, devices) within the memory array region 102, such as the deep contact structures 122, without limitation. The digit line structures 144 and the first conductive routing structures 146 may be located at substantially the same vertical position (e.g., elevation in the Z-direction) as one another within the microelectronic device 100. In addition, the digit line structures 144 and the first conductive routing structures 146 may have substantially the same thickness (e.g., height in the Z-direction) as one another, or may have different thicknesses than one another.

The digit line structures 144 and the first conductive routing structures 146 may individually be formed of and include conductive material. The digit line structures 144 and the first conductive routing structures 146 may have substantially the same material composition as one another, or may have different material compositions than one another. In some embodiments, the digit line structures 144 and the first conductive routing structures 146 have substantially the same material composition as one another. The digit line structures 144 and the first conductive routing structures 146 may, for example, be formed (e.g., simultaneously formed, sequentially formed) by patterning a common conductive material. In some embodiments, the digit line structures 144 and the first conductive routing structures 146 are individually formed of and include W.

Dielectric cap structures 148 may vertically overlie (e.g., directly vertically overlie) and horizontally overlap the digit line structures 144 and the first conductive routing structures 146 of the digit line tier 112. The dielectric cap structures 148 may horizontally extend across and cover upper surfaces of the digit line structures 144 and the first conductive routing structures 146. The dielectric cap structures 148 may be formed of and include insulative material. By way of non-limiting example, the dielectric cap structures 148 may each individually be formed of and include a dielectric nitride material, such as $SiN_y$ (e.g., $Si_3N_4$).

Still referring to FIG. 1, source tier 114 underlying the stack structure 110 may include at least one source structure 150 (e.g., only one source structure, multiple source structures). The source structure 150 may horizontally extend (e.g., in the X-direction, in the Y-direction) in desirable path within the source tier 114. As shown in FIG. 1, in some embodiments, portions of the source structure 150 are located within horizontal areas of the array sub-regions 140 of the memory array region 102, and additional portions of the source structure 150 are located within horizontal areas of the non-array sub-regions 142 of the memory array region 102. The source structure 150 may vertically underlie, horizontally overlap, and be coupled to the cell pillar structures 128 (and, hence, the vertically extending strings of memory cells 138) and, optionally, one or more of the deep contact structures 122. In addition, the source tier 114 may also include additional conductive routing structures horizontally offset from and located at substantially the same vertical position (e.g., elevation in the Z-direction) as the source structure 150 within the microelectronic device 100. The additional conductive routing structures may vertically underlie, horizontally overlap, and be coupled to additional features (e.g., structures, materials, devices) within the memory array region 102, such as additional conductive contact structures, without limitation.

The source structure 150 (and additional conductive routing structures) of the source tier 114 may be formed of and include conductive material. In some embodiments, the source structure 150 (and additional conductive routing structures) of the source tier 114 is formed of and includes conductively doped semiconductive material, such as a conductively doped form of one or more of a silicon material, such as monocrystalline silicon or polycrystalline silicon; a silicon-germanium material; a germanium material; a gallium arsenide material; a gallium nitride material; and an indium phosphide material. As a non-limiting example, the source structure 150 (and additional conductive routing structures) of the source tier 114 may be formed of and include epitaxial silicon (e.g., monocrystalline silicon formed through epitaxial growth) doped with at least one dopant (e.g., one or more of at least one n-type dopant, at least one p-type dopant, and at least another dopant). As another non-limiting example, the source structure 150 (and additional conductive routing structures) of the source tier 114 may be formed of and include polycrystalline silicon doped with at least one dopant (e.g., one or more of at least one n-type dopant, at least one p-type dopant, and at least another dopant). In additional embodiments, the source structure 150 (and additional conductive routing structures) of the source tier 114 is formed of and includes W.

The source tier 114 may be vertically interposed between the stack structure 110 and a base structure 151 underlying the stack structure 110. The base structure 151 may comprise a base material or construction upon which additional features (e.g., materials, structures, devices) of the formed. In some embodiments, the base structure 151 comprises a wafer. The base structure 151 may be formed of and include one or more of semiconductor material (e.g., one or more of a silicon material, such monocrystalline silicon or polycrystalline silicon (also referred to herein as "polysilicon"); silicon-germanium; germanium; gallium arsenide; a gallium nitride; gallium phosphide; indium phosphide; indium gallium nitride; and aluminum gallium nitride), a base semiconductor material on a supporting structure, glass material (e.g., one or more of borosilicate glass (BSP), phosphosilicate glass (PSG), fluorosilicate glass (FSG), borophosphosilicate glass (BPSG), aluminosilicate glass, an alkaline earth boro-aluminosilicate glass, quartz, titania silicate glass, and soda-lime glass), and ceramic material (e.g., one or more of poly-aluminum nitride (p-AlN), silicon on poly-aluminum nitride (SOPAN), aluminum nitride (AlN), aluminum oxide (e.g., sapphire; $\alpha$-$Al_2O_3$), and silicon carbide). By way of non-limiting example, the base structure 151 may comprise a semiconductor wafer (e.g., a silicon wafer), a glass wafer, or a ceramic wafer. The base structure 151 may include one or more layers, structures, and/or regions formed therein and/or thereon.

With continued reference to FIG. 1, at least one isolation material 152 may at least partially cover and surround of features (e.g., structures, materials, devices, regions) of the microelectronic device 100, including features of the base structure 151 and features (e.g., the stack structure 110, including conductive structures 116 and the insulative structures 118 thereof; the digit line structures 144; the first conductive routing structures 146; the dielectric cap structures 148; the source structure 150; the cell pillar structures 128; the deep contact structure 122; additional structures; additional materials; additional devices) of the memory array region 102. As shown in FIG. 1 and described in further detail below, the at least one isolation material 152 may also at least partially cover and surround features of the microelectronic device 100 outside of the memory array region 102, such as features within the interconnect region 104, the control logic region 106, and the pad region 108 of the microelectronic device 100. The isolation material 152 may be formed of and include at least one insulative material. In some embodiments, the isolation material 152 is formed of and includes $SiO_x$ (e.g., $SiO_2$).

Optionally, the memory array region 102 of the microelectronic device 100 may further include additional deep contact structures 154 positioned within horizontal areas of the non-array sub-regions 142 and vertically extending from the digit line tier 112 to the source tier 114. For example, as shown in FIG. 1, at least some of the additional deep contact structures 154 be positioned within horizontal areas of filled trenches 111 horizontally neighboring the stack structure 110. The filled trenches 111 may comprise trenches at least partially filled with the isolation material 152. The additional deep contact structures 154 may vertically extend through and physically contact the isolation material 152 of the filled trenches 111. The additional deep contact structures 154 may couple features of the digit line tier 112 to features of the source tier 114. For example, as depicted in FIG. 1, an individual additional deep contact structure 154 may vertically extend from an individual first conductive routing structure 146 of the digit line tier 112, through the isolation material 152 within an individual non-array sub-region 142, and to the source structure 150 of the source tier 114. If included, the additional deep contact structures 154 may be formed of and include conductive material. In some embodiments, the additional deep contact structures 154 are present, and are individually formed of and include W. In additional embodiments, the additional deep contact structures 154 are omitted (e.g., absent) from the microelectronic device 100. Electrical communication between features (e.g., first conductive routing structures 146) of the digit line tier 112 and features (e.g., source structure 150) of the source tier 114 may be facilitated without the additional deep contact structures 154, such as by way of the deep contact structures 122 vertically extending through and horizontally overlapping the stack structure 110.

With continued reference to FIG. 1, the interconnect region 104 of the microelectronic device 100 may couple features of the control logic region 106 to features of the memory array region 102. The interconnect region 104 may include, without limitation, first contact structures 166, connected bond pads 160, conductive routing tiers 158 including second conductive routing structures 168, and second contact structures 170. The first contact structures 166 may vertically overlie and be coupled to the digit line structures 144 and the first conductive routing structures 146 of the digit line tier 112 of the memory array region 102. The connected bond pads 160 may vertically overlie and be coupled to the first contact structures 166. The second conductive routing structures 168 of the conductive routing tiers 158 may vertically overlie and be coupled to the connected bond pads 160. The second contact structures 170 may couple different second conductive routing structures 168 to one another and the connected bond pads 160.

The first contact structures 166 of the interconnect region 104 may vertically extend from the connected bond pads 160 to the digit line structures 144 and the first conductive routing structures 146 of the digit line tier 112 of the memory array region 102. The first contact structures 166 may vertically extend through dielectric cap structures 148 overlying the digit line structures 144 and the first conductive routing structures 146, and through portions of the isolation material 152 overlying the dielectric cap structures 148. The first contact structures 166 may horizontally overlap the connected bond pads 160 and the digit line structures 144. In some embodiments, the first contact structures 166 comprise conductively filled vias. The first contact structures 166 may be located at desired positions along lengths (e.g., in the Y-direction) of the digit line structures 144 and the first conductive routing structures 146. The first contact structures 166 may be formed of and include conductive material. By way of non-limiting example, the first contact structures 166 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the first contact structures 166 are formed of and include Cu. In some embodiments, the first contact structures 166 are formed of and include W.

The connected bond pads 160 of the interconnect region 104 may vertically extend from some of the second contact structures 170 to the first contact structures 166. The connected bond pads 160 may individually include a lower portion 162, and an upper portion 164 attached (e.g., bonded, such as metal-metal bonded) to the lower portion 162. The lower portions 162 of the connected bond pads 160 may be formed during the formation of the microelectronic device structure 101, as bond pads of the microelectronic device structure 101. The upper portions 164 of the connected bond pads 160 may be formed during the formation of the additional microelectronic device structure 103 separate from the microelectronic device structure 101, as additional bond pads of the additional microelectronic device structure 103. During attachment (e.g., bonding) of the additional microelectronic device structure 103 to the microelectronic device structure 101, the additional bond pads of the additional microelectronic device structure 103 may be attached (e.g., bonded, such as metal-metal bonded) to the bond pads of the microelectronic device structure 101 to form the connected bond pads 160, including the upper portions 164 (corresponding to the additional bond pads) and the lower portions 162 (corresponding to the bond pads) thereof. While in FIG. 1, the lower portion 162 and the upper portion 164 of each connected bond pad 160 are distinguished from one another by way of a dashed line, the lower portion 162 and the upper portion 164 may be integral and continuous with one another. Put another way, each connected bond pad 160 may be a substantially monolithic structure including the lower portion 162 and the upper portion 164. For each connected bond pad 160, the lower portion 162 thereof may be physically connected to the upper portion 164 thereof without a bond line.

The connected bond pads 160 (including the lower portions 162 and the upper portions 164 thereof) may be formed of and include conductive material. By way of non-limiting example, the connected bond pads 160 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, each of the connected bond pads 160 (including the lower portion 162 and the upper portion 164 thereof) is formed of and includes Cu.

The second conductive routing structures 168 of the conductive routing tiers 158 may vertically overlie (e.g., in the Z-direction) the connected bond pads 160, and may be electrically connected to one another and the connected bond pads 160 in desirable ways (facilitating desirable electrical paths within the microelectronic device 100) by way of the second contact structures 170. The second conductive routing structures 168 may serve as local routing structures for the microelectronic device 100. A first group of the second contact structures 170 may vertically extend between and couple the connected bond pads 160 to one or more of the second conductive routing structures 168. In addition, a second group of the second contact structures 170 may vertically extend between and couple some of the second conductive routing structures 168 to one another.

The interconnect region 104 may include multiple conductive routing tiers 158 including the second conductive routing structures 168. By way of non-limiting example, as shown in FIG. 1, the interconnect region 104 may include three (3) conductive routing tiers 158 individually including some of the second conductive routing structures 168. Within an individual conductive routing tier 158, the second conductive routing structures 168 included therein may horizontally extend in paths having desired geometric configurations (e.g., shapes, sizes). As shown in FIG. 1, a first tier 158A of the conductive routing tiers 158 may include a first group 168A of the second conductive routing structures 168; a second tier 158B of the conductive routing tiers 158 vertically overlying the first tier 158A may include a second group 168B of the second conductive routing structures 168; and a third tier 158C of the conductive routing tiers 158 vertically overlying the second tier 158B may include a third group 168C of the second conductive routing structures 168. In additional embodiments, the interconnect region 104 may include a different quantity of the conductive routing tiers 158, such as greater than three (3) conductive routing tiers 158, or less than three (3) conductive routing tiers 158.

The second conductive routing structures 168 may individually be formed of and include conductive material. By way of non-limiting example, the second conductive routing structures 168 may individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the second conductive routing structures 168 are individually formed of and include Cu. In additional embodiments, the second conductive routing structures 168 are individually formed of and include W.

The second contact structures 170 (including the first group and the second group thereof) may individually be formed of and include conductive material. By way of non-limiting example, the second contact structures 170 may individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the second contact structures 170 are formed of and include Cu. In additional embodiments, the second contact structures 170 are formed of and include W. In further embodiments, the second contact structures 170 of a first group of the second contact structures 170 in physical contact with the connected bond pads 160 are formed of and include first conductive material (e.g., Cu); and the second contact structures 170 of a second group of the second contact structures 170 vertically extending from and between different second conductive routing structures 168 are formed of and include a second, different conductive material (e.g., W).

As shown in FIG. 1, the at least one isolation material 152 may at least partially cover and surround of features (e.g., structures, materials, devices, regions) of the microelectronic device 100 within the interconnect region 104. For example, the isolation material 152 may at least partially cover and surround the first contact structures 166, the connected bond pads 160, the second conductive routing structures 168, and the second contact structures 170.

Still referring to FIG. 1, the control logic region 106 of the microelectronic device 100 may include a base semiconductor structure 172, filled trenches 174, transistors 176, third contact structures 178, fourth contact structures 180, additional conductive routing tiers 182 including third conductive routing structures 184, fifth contact structures 186, and sixth contact structures 204. The filled trenches 174 vertically extend (e.g., in the Z-direction) into the base semiconductor structure 172. The transistors 176 at least partially vertically underlie the base semiconductor structure 172 and the filled trenches 174. The third contact structures 178 and fourth contact structures 180 may at least partially vertically underlie and be coupled to the transistors 176. The third conductive routing structures 184 of the additional conductive routing tiers 182 may vertically underlie and be coupled to the third contact structures 178 and fourth contact structures 180. The fifth contact structures 186 may couple different third conductive routing structures 184 to one another and the second conductive routing structures 168 of the interconnect region 104 of the microelectronic device 100. The sixth contact structures 204 may vertically extend through the base semiconductor structure 172, and may be coupled to some of the third conductive routing structures 184. The sixth contact structures 204 may electrically connect features (e.g., pad structures) within the pad region 108 of the microelectronic device 100 to control logic circuitry associated with the third conductive routing structures 184, as described in further detail below.

The base semiconductor structure 172 comprises a base material or construction upon which additional features (e.g., materials, structures, devices) of the microelectronic device 100 are formed. The base semiconductor structure 172 may comprise a semiconductor structure (e.g., a semiconductor wafer), or a base semiconductor material on a supporting structure. For example, the base semiconductor structure 172 may comprise a conventional silicon substrate (e.g., a conventional silicon wafer), or another bulk substrate comprising a semiconductor material. In some embodiments, the base semiconductor structure 172 comprises a silicon wafer. The base semiconductor structure 172 may include one or more layers, structures, and/or regions formed therein and/or thereon. The base semiconductor structure 172 may include a substantially planar upper boundary (e.g., upper surface), and a non-planar lower boundary (e.g., lower surface). In some embodiments, a vertical thickness of the base semiconductor structure 172, from an upper vertical boundary (e.g., an upper surface) thereof to a lower vertical boundary (e.g., a lower surface) thereof, is less than or equal to about 10 micrometers (μm), such as within a range of from about 1 μm to about 10 inn, from about 1 μm to about 9 μm, from about 5 μm to about 9 μm, from about 6 μm to about 9 μm, from about 7 μm to about 9 μm, or from about 8 μm to about 9 μm.

The filled trenches 174 may comprise trenches (e.g., openings, vias, apertures) within the base semiconductor structure 172 that are at least partially (e.g., substantially) filled with the isolation material 152. The filled trenches 174 may, for example, be employed as one or more of shallow trench isolation (STI) structures and deep trench isolation (DTI) structures within the base semiconductor structure 172. The filled trenches 174 may individually be formed to vertically extend at least partially (e.g., less than completely, completely) through the base semiconductor structure 172. Each of the filled trenches 174 may be formed to exhibit substantially the same dimensions and shape as each other of the filled trenches 174, or at least one of the filled trenches 174 may be formed to exhibit one or more of different dimensions and a different shape than at least one other of the filled trenches 174. As a non-limiting example, each of the filled trenches 174 may be formed to exhibit substantially the same vertical dimension(s) and substantially the same vertical cross-sectional shape(s) as each other of the filled trenches 174; or at least one of the filled trenches 174 may be formed to exhibit one or more of different vertical dimension(s) and different vertical cross-sectional shape(s) than at least one other of the filled trenches 174. In some embodiments, the filled trenches 174 are all formed to vertically extend to and terminate at substantially the same depth within the base semiconductor structure 172. In additional embodiments, at least one of the filled trenches 174 is formed to vertically extend to and terminate at a relatively deeper depth within the base semiconductor structure 172 than at least one other of the filled trenches 174. In further embodiments, one or more (e.g., all, less than all) of the filled trenches 174 are formed to vertically extend completely through the base semiconductor structure 172. As another non-limiting example, each of the filled trenches 174 may be formed to exhibit substantially the same horizontal dimension(s) and substantially the same horizontal cross-sectional shape(s) as each other of the filled trenches 174; or at least one of the filled trenches 174 may be formed to exhibit one or more of different horizontal dimension(s) (e.g., relatively larger horizontal dimension(s), relatively smaller horizontal dimension(s)) and different horizontal cross-sectional shape(s) than at least one other of the filled trenches 174. In some embodiments, at least one of the filled trenches 174 is formed to have one or more different horizontal dimensions (e.g., in the X-direction and/or in the Y-direction) than at least one other of the filled trenches 174.

The transistors 176 may individually be formed to include conductively doped regions 188, a channel region 190, a gate structure 192, and a gate dielectric material 194. The transistors 176 may be vertically positioned at or proximate the lower boundary (e.g., lower surface) of the base semiconductor structure 172. For an individual transistor 176, the conductively doped regions 188 thereof may be formed within a portion (e.g., an elevated portion) of the base semiconductor structure 172 horizontally neighboring one or more of the filled trenches 174; the channel region 190 thereof may be within the base semiconductor structure 172 and may be horizontally interposed between the conductively doped regions 188 thereof; the gate structure 192 may vertically underlie and horizontally overlap the channel region 190; and the gate dielectric material 194 (e.g., a dielectric oxide) may be vertically interposed (e.g., in the Z-direction) between the gate structure 192 and the channel region 190. The conductively doped regions 188 of an individual transistor 176 may include a source region and a drain region.

For an individual transistor 176, the conductively doped regions 188 thereof may comprise semiconductor material of the base semiconductor structure 172 doped with one or more desired conductivity-enhancing dopants. In some embodiments, the conductively doped regions 188 of the transistor 176 comprise semiconductor material (e.g., silicon) doped with at least one N-type dopant (e.g., one or more of phosphorus, arsenic, antimony, and bismuth). In some of such embodiments, the channel region 190 of the transistor 176 comprises the semiconductor material doped with at least one P-type dopant (e.g., one or more of boron, aluminum, and gallium). In some other of such embodiments, the channel region 190 of the transistor 176 comprises substantially undoped semiconductor material (e.g., substantially undoped silicon). In additional embodiments, for an individual transistor 176, the conductively doped regions 188 thereof comprise semiconductor material (e.g., silicon) doped with at least one P-type dopant (e.g., one or more of boron, aluminum, and gallium). In some of such additional embodiments, the channel region 190 of the transistor 176 comprises the semiconductor material doped with at least one N-type dopant (e.g., one or more of phosphorus, arsenic, antimony, and bismuth). In some other of such additional embodiments, the channel region 190 of the transistor 176 comprised substantially undoped semiconductor material (e.g., substantially undoped silicon).

The gate structures 192 (e.g., gate electrodes) may individually horizontally extend (e.g., in the X-direction) between and be employed by multiple transistors 176. The gate structures 192 may be formed of and include conductive material. The gate structures 192 may individually be substantially homogeneous, or the gate structures 192 may individually be heterogeneous. In some embodiments, the gate structures 192 are each substantially homogeneous. In additional embodiments, the gate structures 192 are each heterogeneous. Individual gate structures 192 may, for example, be formed of and include a stack of at least two different conductive materials.

The third contact structures 178 may individually be formed to vertically extend between and couple the gate structures 192 (and, hence, the transistors 176) to one or more of the third conductive routing structures 184 of the additional conductive routing tiers 182. The third contact structures 178 may individually be formed of and include conductive material. By way of non-limiting example, the third contact structures 178 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the third contact structures 178 are formed of and include W. In additional embodiments, the third contact structures 178 are formed of and include Cu.

The fourth contact structures 180 may be formed to vertically extend between and couple the conductively doped regions 188 (e.g., source regions, drain regions) of the transistors 176 to some of the third conductive routing structures 184 of the additional conductive routing tiers 182. The fourth contact structures 180 may individually be formed of and include conductive material. By way of non-limiting example, the fourth contact structures 180 may be formed of and include one or more of at least one metal, at least one alloy, and at least one conductive metal-containing material (e.g., a conductive metal nitride, a conductive metal silicide, a conductive metal carbide, a conductive metal oxide). A material composition of the fourth contact structures 180 may be substantially the same as a material composition of the third contact structures 178, or the material composition of one or more of the fourth contact structures 180 may be different than the material composition of one or more of the third contact structures 178. In some embodiments, the fourth contact structures 180 are formed of and include W. In additional embodiments, the fourth contact structures 180 are formed of and include Cu.

The third conductive routing structures 184 of the additional conductive routing tiers 182 may at least partially vertically underlie (e.g., in the Z-direction) the transistors 176, and may be electrically connected to one another, the third contact structures 178, the fourth contact structures 180, the fifth contact structures 186, the sixth contact structures 204, and the second conductive routing structures 168 in desirable ways (facilitating desirable electrical paths within the microelectronic device 100). A first group of the fifth contact structures 186 may vertically extend between and couple one or more of the second conductive routing structures 168 to one or more of the third conductive routing structures 184. In addition, a second group of the fifth contact structures 186 may vertically extend between and couple some of the third conductive routing structures 184 to one another.

The control logic region 106 may include multiple (e.g., more than one) additional conductive routing tiers 182 including the third conductive routing structures 184. By way of non-limiting example, as shown in FIG. 1, the control logic region 106 may include two (2) additional conductive routing tiers 182 individually including some of the third conductive routing structures 184. Within an individual additional conductive routing tiers 182, the third conductive routing structures 184 included therein may horizontally extend in paths having desired geometric configurations (e.g., shapes, sizes). As shown in FIG. 1, a first tier 182A of the additional conductive routing tiers 182 may include a first group 184A of the third conductive routing structures 184; and a second tier 182B of the additional conductive routing tiers 182 vertically overlying the first tier 182A may include a second group 184B of the third conductive routing structures 184. In additional embodiments, the control logic region 106 may include a different quantity of the additional conductive routing tiers 182, such as greater than two (2) additional conductive routing tiers 182, or one (1) additional conductive routing tier 182.

The third conductive routing structures 184 may each individually be formed of and include conductive material. By way of non-limiting example, the third conductive routing structures 184 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the third conductive routing structures 184 are individually formed of and include Cu. In additional embodiments, the third conductive routing structures 184 are individually formed of and include W.

The fifth contact structures 186 (including the first group and the second group thereof) may individually be formed of and include conductive material. By way of non-limiting example, the fifth contact structures 186 may be formed of and include one or more of at least one metal, at least one alloy, and at least one conductive metal-containing material (e.g., a conductive metal nitride, a conductive metal silicide, a conductive metal carbide, a conductive metal oxide). In some embodiments, the fifth contact structures 186 are formed of and include Cu. In additional embodiments, the fifth contact structures 186 are formed of and include W.

With continued reference to FIG. 1, at least the transistors 176, the third contact structures 178, the fourth contact structures 180, and the third conductive routing structures 184 may form control logic circuitry of various control logic devices 196 of the control logic region 106. The control logic devices 196 may be configured to control various operations of various features (e.g., the memory cells 138) of the microelectronic device 100. As a non-limiting example, the control logic devices 196 may include one or more (e.g., each) of charge pumps (e.g., VCCP charge pumps, VNEGWL charge pumps, DVC2 charge pumps), delay-locked loop (DLL) circuitry (e.g., ring oscillators), $V_{dd}$ regulators, drivers (e.g., main word line drivers, sub word line drivers (SWD)), page buffers, decoders (e.g., local deck decoders, column decoders, row decoders), sense amplifiers (e.g., equalization (EQ) amplifiers, isolation (ISO) amplifiers, NMOS sense amplifiers (NSAs), PMOS sense amplifiers (PSAs)), repair circuitry (e.g., column repair circuitry, row repair circuitry), I/O devices (e.g., local I/O devices), memory test devices, array multiplexers (MUX), error checking and correction (ECC) devices, self-refresh/wear leveling devices, and other chip/deck control circuitry. In some embodiments, the control logic devices 196 comprise complementary metal-oxide-semiconductor (CMOS) circuitry. The CMOS circuitry of the control logic devices 196 may vertically overlie and at least partially horizontally overlap the stack structure 110 of the microelectronic device 100. The CMOS circuitry of the control logic devices 196 may be vertically positioned above the memory array region 102 of the microelectronic device 100, and may be horizontally positioned at least partially (e.g., substantially) within horizontal boundaries of the array sub-regions 140 of the memory array region 102. Accordingly, the microelectronic device 100 may have a so-called CMOS above array ("CaA") configuration.

At least some of the sixth contact structures 204 may individually vertically extend (e.g., in the Z-direction) completely through the base semiconductor structure 172 and to a respective one of the third conductive routing structures 184 of the additional conductive routing tiers 182. Optionally, one or more of the sixth contact structures 204 may individually vertically extend (e.g., in the Z-direction) completely through the base semiconductor structure 172 and to circuitry within the memory array region 102 of the microelectronic device 100. If semiconductor material of the base semiconductor structure 172 includes silicon (e.g., if the base semiconductor structure 172 is a silicon wafer), the sixth contact structures 204 may comprise so-called "through silicon contact" (TSC) structures and/or so-called "through silicon via" (TSV) structures. The sixth contact structures 204 may also individually vertically extend through one or more portions of the isolation material 152 within the microelectronic device 100, such as a portion of the isolation material 152 vertically interposed between an upper boundary (e.g., an upper surface) of the third conductive routing structure 184 in contact therewith and a lower boundary (e.g., a lower surface) of the base semiconductor structure 172. In some embodiments, at least some of the sixth contact structures 204 vertically extend from some of third conductive routing structures 184, through one or more of the filled trenches 174, and to or beyond an upper boundary (e.g., an upper surface) of the base semiconductor structure 172. The sixth contact structures 204 may horizontally overlap the filled trenches 174. At least some of the sixth contact structures 204 may be horizontally interposed between horizontally neighboring transistors 176 of the control logic region 106. As described in further detail below, at least some of the sixth contact structures 204 may be employed to facilitate electrical connection between some of the third conductive routing structures 184 and features (e.g., pad structures) of the pad region 108 overlying the upper boundary of the base semiconductor structure 172.

An individual filled trench 174 may include a single (e.g., only one) sixth contact structure 204 vertically extending therethrough and within a horizontal area thereof, or may include multiple (e.g., more than one) sixth contact structures 204 vertically extending therethrough and within a horizontal area thereof. Accordingly, a horizontally neighboring pair of the transistors 176 having an individual filled trench 174 horizontally interposed therebetween may have a single (e.g., only one) sixth contact structure 204 horizontally interposed therebetween, or may include multiple (e.g., more than one) sixth contact structures 204 horizontally interposed therebetween. If an individual filled trench 174 includes multiple sixth contact structures 204 vertically extending therethrough and within a horizontal area thereof, the multiple sixth contact structures 204 may all vertically extend from and between the same pair of features (e.g., including the same third conductive routing structure 184 and the same pad structure of the pad region 108) of the microelectronic device 100 as one another, or at least one of the multiple sixth contact structures 204 may vertically extend from and between a different pair of features of the microelectronic device 100 than at least one other of the multiple sixth contact structures 204. In addition, sixth contact structures 204 vertically extending through and within horizontal areas of different filled trenches 174 than one another may vertically extend from and between the same pair of features (e.g., including the same third conductive routing structure 184 and the same pad structure of the pad region 108) of the microelectronic device 100 as one another, or may vertically extend from and between different pairs of features of the microelectronic device 100 than one another.

Still referring to FIG. 1, at least some of the sixth contact structures 204 may horizontally overlap the stack structure 110 of the microelectronic device 100. At least some of the sixth contact structures 204 may be positioned within horizontal areas of (e.g., may horizontally overlap) the array sub-regions 140 of the memory array region 102 of the microelectronic device 100. In some embodiments, all of the sixth contact structures 204 are positioned within the horizontal areas of (e.g., horizontally overlap) the array sub-regions 140 of the memory array region 102. In additional embodiments, less than all of the sixth contact structures 204 are positioned within the horizontal areas of (e.g., horizontally overlap) the array sub-regions 140 of the memory array region 102. For example, one or more of the sixth contact structures 204 may be positioned within horizontal areas of the array sub-regions 140 of the memory array region 102, and one or more other of the sixth contact structures 204 may be positioned within horizontal areas of the non-array sub-regions 142 of the memory array region 102. In further embodiments, at least one of the sixth contact structures 204 is positioned within a horizontal area of (e.g., horizontally overlaps) at least one of the non-array sub-regions 142 of the memory array region 102. At least some of the sixth contact structures 204 may horizontally overlap the control logic circuitry of at least some of the control logic devices 196.

The sixth contact structures 204 may individually be formed of and include conductive material. By way of non-limiting example, the sixth contact structures 204 be formed of and include one or more of at least one metal, at least one alloy, and at least one conductive metal-containing material (e.g., a conductive metal nitride, a conductive metal silicide, a conductive metal carbide, a conductive metal oxide). In some embodiments, the sixth contact structures 204 are formed of and include W. In additional embodiments, the sixth contact structures 204 are formed of and include Cu.

Optionally, additional insulative liner material 206 may substantially continuously extend over and substantially cover portions of side surfaces of the sixth contact structures 204 vertically extending through the base semiconductor structure 172. The additional insulative liner material 206 may be horizontally interposed between the sixth contact structures 204 and base semiconductor structure 172, and may electrically isolate the sixth contact structures 204 from features of the base semiconductor structure 172. In some embodiments, additional insulative liner material 206 is present, and is formed of and includes at least one dielectric oxide material (e.g., $SiO_x$, such as $SiO_2$).

As shown in FIG. 1, the at least one isolation material 152 may at least partially cover and surround of features (e.g., structures, materials, devices, regions) of the microelectronic device 100 within the control logic region 106. For example, the isolation material 152 may at least partially cover and surround the base semiconductor structure 172, the transistors 176, the third contact structures 178, the fourth contact structures 180, the third conductive routing structures 184, the fifth contact structures 186, and the sixth contact structures 204.

Still referring to FIG. 1, the pad region 108 of the microelectronic device 100 may include at least one pad tier 198 including pad structures 200. The pad structures 200 may vertically overlie upper boundaries (e.g., upper surfaces) of the base semiconductor structure 172 and the sixth contact structures 204. The pad structures 200 may be coupled to the sixth contact structures 204, and, hence, the control logic devices 196 of the control logic region 106 coupled to the sixth contact structures 204. The pad structures 200 may, for example, be configured to receive global signals from an external bus, and to relay the global signals to other features (e.g., structures, devices) of the microelectronic device 100, including control logic circuitry of the control logic region 106, by way of the sixth contact structures 204.

The pad structures 200 of the pad region 108 may be vertically positioned proximate an upper boundary of the base semiconductor structure 172. In some embodiments, the pad structures 200 individually physically contact an upper surface of at least one of the sixth contact structures 204 vertically extending through the base semiconductor structure 172. In embodiments wherein an upper surface of an individual sixth contact structure 204 vertically overlies an upper surface of the base semiconductor structure 172, the pad structures 200 in contact with the sixth contact structure 204 may be vertically offset from the upper surface of the base semiconductor structure 172 by a vertical height of portions of the sixth contact structure 204 vertically overlying the upper surface of the base semiconductor structure 172.

An individual pad structure 200 may have a single (e.g., only one) sixth contact structure 204 in contact (e.g., physical contact, electrical contact) therewith, or may have multiple (e.g., more than one) sixth contact structures 204 in contact (e.g., physical contact, electrical contact) therewith. Accordingly, an individual pad structure 200 may vertically overlie and horizontal overlap a single (e.g., only one) sixth contact structure 204, or may vertically overlie and horizontal overlap multiple (e.g., more than one) sixth contact structures 204. If an individual pad structure 200 has multiple sixth contact structures 204 in contact therewith, each of the multiple sixth contact structures 204 may vertically extend from the pad structure 200 to the same feature (e.g., the same third conductive routing structure 184) within the control logic region 106, or at least one of the multiple sixth contact structures 204 may vertically extend from the pad structure 200 to a different feature (e.g., a different third conductive routing structure 184) within the control logic region 106 than at least one other of the multiple sixth contact structures 204. If at least two sixth contact structures 204 in contact with the same pad structure 200 as one another vertically extend to and contact different features (e.g., a different third conductive routing structures 184) within the control logic region 106 than one another, the at least two sixth contact structures 204 may be coupled to the same control logic device 196 of the control logic region 106 as one another (e.g., the different third conductive routing structures 184 may be coupled to the same control logic device 196 as one another), or the at least two sixth contact structures 204 may be coupled to different control logic devices 196 of the control logic region 106 than one another (e.g., the different third conductive routing structures 184 may be coupled to different control logic devices 196 than one another). An individual sixth contact structure 204 in contact with an individual pad structure 200 may be in electrical communication with only one control logic device 196 of the control logic region 106, or may be in electrical communication with multiple control logic devices 196 of the control logic region 106.

Pad structures 200 in contact with different sixth contact structures 204 than one another may be coupled to the same feature(s) (e.g., the same third conductive routing structure 184, and the same control logic device(s) 196 coupled to the third conductive routing structure 184) within the control logic region 106 as one another, or may be coupled to different features (e.g., different third conductive routing structures 184, and different control logic device(s) 196 coupled to the different third conductive routing structures 184) within the control logic region 106 than one another. In some embodiments, at least two (2) of the pad structures 200 are in electrical communication with different control logic devices 196 of the control logic region 106 than one another. In additional embodiments, at least two (2) of the pad structures 200 are in electrical communication with the same control logic device(s) 196 of the control logic region 106 as one another.

An individual pad structure 200 may be substantially horizontally aligned with one or more (e.g., each) sixth contact structures 204 in contact therewith in one or more (e.g., each) of the X-direction and the Y-direction; or an individual pad structure 200 may be horizontally offset from one or more of the sixth contact structures 204 in contact therewith in one or more (e.g., each) of the X-direction and the Y-direction. As a non-limiting example, for individual pad structure 200, a horizontal center thereof in the X-direction may be substantially aligned with a horizontal center in the X-direction of an individual sixth contact structure 204 in contact therewith; and/or a horizontal center thereof in the Y-direction may be substantially aligned with a horizontal center in the Y-direction of the sixth contact structure 204 in contact therewith. As another non-limiting example, for individual pad structure 200, a horizontal center thereof in the X-direction may be offset from a horizontal center in the X-direction of an individual sixth contact structure 204 in contact therewith; and/or a horizontal center thereof in the Y-direction may be offset from a horizontal center in the Y-direction of the sixth contact structure 204 in contact therewith. If an individual pad structure 200 has a group of the sixth contact structures 204 in contact therewith, a horizontal center of each sixth contact structure 204 of the group may be substantially aligned with a horizontal center of the pad structure 200 in one horizontal direction (e.g., the X-direction or the Y-direction); or the horizontal center of at least one sixth contact structure 204 of the group may be offset from the horizontal center of the pad structure 200 in the one horizontal direction.

Still referring to FIG. 1, at least some of the pad structures 200 may horizontally overlap the stack structure 110 of the microelectronic device 100. At least some of the pad structures 200 may be positioned within horizontal areas of (e.g., may horizontally overlap) the array sub-regions 140 of the memory array region 102 of the microelectronic device 100. In some embodiments, all of the pad structures 200 are positioned within the horizontal areas of (e.g., horizontally overlap) the array sub-regions 140 of the memory array region 102. In additional embodiments, less than all of the pad structures 200 are positioned within the horizontal areas of (e.g., horizontally overlap) the array sub-regions 140 of the memory array region 102. For example, one or more of the pad structures 200 may be positioned within horizontal areas of the array sub-regions 140 of the memory array region 102, and one or more other of the pad structures 200 may be positioned within horizontal areas of the non-array sub-regions 142 of the memory array region 102. In further embodiments, at least one of the pad structures 200 is positioned within a horizontal area of (e.g., horizontally overlaps) at least one of the non-array sub-regions 142 of the memory array region 102. At least some of the pad structures 200 may horizontally overlap the control logic circuitry (e.g., transistors 176) of at least some of the control logic devices 196 of the control logic region 106.

The pad region 108 of the microelectronic device 100 may include a desired quantity (e.g., one, two, more than two) of pad tiers 198, and a desired quantity and arrangement of pad structures 200 within an individual pad tier 198. In some embodiments, the pad region 108 includes only one pad tier 198. The pad structures 200 of an individual pad tier 198 may be located at substantially the same vertical position (e.g., elevation in the Z-direction) as one another within the microelectronic device 100. In addition, the pad structures 200 of an individual pad tier 198 may have substantially the same thickness (e.g., height in the Z-direction) as one another, or may have different thicknesses than one another.

The pad structures 200 of the pad region 108 may individually be formed of and include conductive material. By way of non-limiting example, the pad structures 200 may individually be formed of and include one or more of at least one metal, at least one alloy, and at least one conductive metal-containing material (e.g., a conductive metal nitride, a conductive metal silicide, a conductive metal carbide, a conductive metal oxide). In some embodiments, the pad structures 200 are individually formed of and include Cu. In additional embodiments, the pad structures 200 are individually formed of and include Al. In further embodiments, the pad structures 200 are individually formed of and include W.

Positioning of the pad region 108 of the microelectronic device 100 vertically proximate (e.g., directly vertically adjacent) to the control logic region 106 of the microelectronic device 100 may enhance signal transmission speed and improve signal integrity during use and operation of the microelectronic device 100 as compared to conventional microelectronic devices including pad regions positioned relatively more vertically distal from control logic regions. By way of non-limiting example, positioning the pad region 108 vertically proximate to the control logic region 106, and facilitating electronic communication between the pad structures 200 of the pad region 108 and the control logic devices 196 of the control logic region 106 by way (in part) of the sixth contact structures 204, may enhance signal transmission speed between the pad structures 200 and the control logic devices 196 relative to conventional configurations wherein a memory array region is vertically interposed between a pad region and a control logic region. Vertical dimensions of the sixth contact structures 204 of the microelectronic device 100 may, for example, be smaller than vertical dimensions of conventional contact structures employed in conventional microelectronic devices to facilitate electrical communication between pad structures vertically overlying a memory array region and control logic devices vertically underling the memory array region, which may enhance signal transmission speed and improve signal integrity of the microelectronic device 100 as compared to such conventional microelectronic devices. In addition, positioning the pad region 108 vertically proximate to the control logic region 106 may reduce routing complexity to facilitate electrical communication between the pad structures 200 and the control logic devices 196 as compared to conventional microelectronic device configurations wherein arrangements of features (e.g., features of a memory array region, features of an interconnect region) vertically interposed between pad structures thereof and control logic devices thereof need to be accounted for.

Furthermore, the configuration of the microelectronic device 100 permits faster signal transmission to relatively more timing-sensitive features of the microelectronic device 100, such as the control logic devices 196 within the control logic region 106, as compared to relatively less timing-sensitive features of the microelectronic device 100, such as the source structure 150 within the memory array region 102. For example, positioning the control logic devices 196 over the vertically extending strings of memory cells 138 and proximate to the pad structures 200, while positioning the source structure 150 under the vertically extending strings of memory cells 138, may permit signals to be transmitted to the control logic devices 196 (which may be relatively more timing-sensitive) faster than the source structure 150.

As shown in FIG. 1, the at least one isolation material 152 may at least partially cover and surround of features (e.g., structures, materials, devices, regions) of the microelectronic device 100 within the pad region 108. For example, the isolation material 152 may at least partially cover and surround the pad structures 200. A portion the isolation material 152 may vertically interposed between an upper boundary (e.g., an upper surface) of the base semiconductor structure 172 and lower boundaries (e.g., lower surfaces) of the pad structures 200. In addition, optionally, one or more openings 202 may formed within the isolation material 152 to expose portions (e.g., upper surface portions) of one or more of the pad structures 200.

Thus, a microelectronic device according to embodiments of the disclosure includes a memory array region, a control logic region overlying the memory array region, and a pad region overlying the control logic region. The memory array region includes a stack structure including vertically alternating conductive structures and insulating structures; vertically extending strings of memory cells within the stack structure; at least one source structure vertically underlying the stack structure and coupled to the vertically extending strings of memory cells; and digit line structures vertically overlying the stack structure and coupled to the vertically extending strings of memory cells. The control logic region includes control logic devices configured to effectuate control operations for the vertically extending strings of memory cells. The pad region includes conductive pad structures coupled to the control logic devices.

Furthermore, a memory device according to embodiments of the disclosure includes a memory array region, an interconnect region overlying the memory array region, a control logic region overlying the interconnect region, and a pad region overlying the control logic region. The memory array region includes a stack structure including tiers each including conductive material and insulative material vertically neighboring the conductive material; strings of memory cells extending through the stack structure; one or more source structures underlying the stack structure and coupled to the strings of memory cells; and data line structures overlying the stack structure and coupled to the strings of memory cells. The interconnect region includes conductive pad structures overlying and coupled to the data line structures; and conductive routing structures overlying and coupled to the conductive pad structures. The control logic region includes a base semiconductor structure; conductive contact structures extending completely through the base semiconductor structure; and complementary metal-oxide-semiconductor (CMOS) circuitry at least partially underlying the base semiconductor structure and coupled to the conductive contact structures. The pad region includes additional conductive pad structures coupled to the conductive contact structures.

Figure 2:
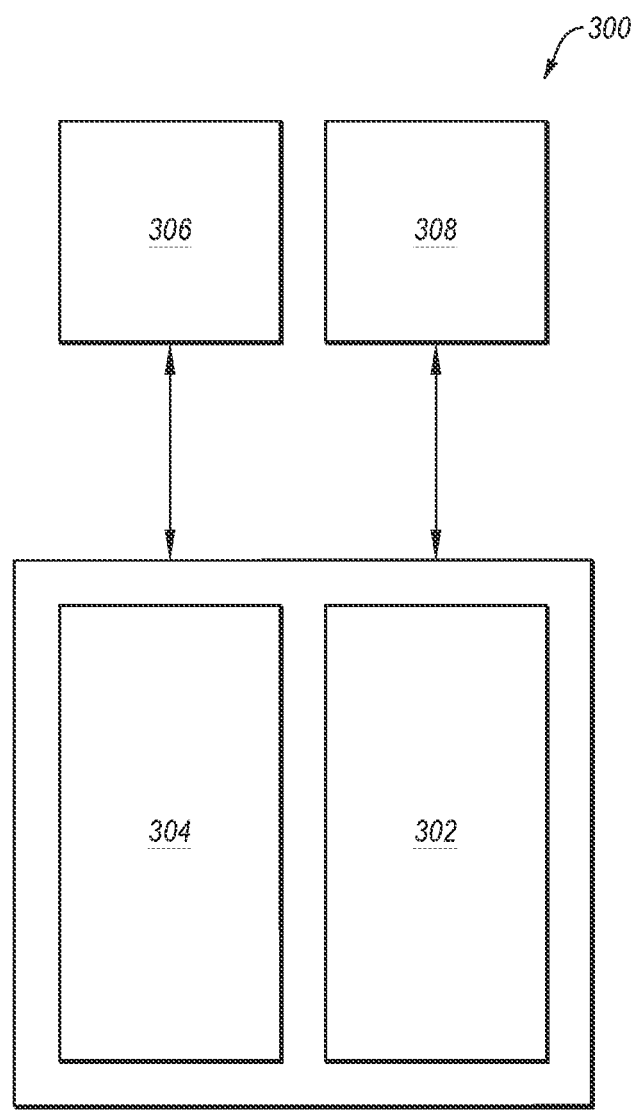
FIG. 2 is a schematic block diagram of an electronic system, in accordance with an embodiment of the disclosure.

Microelectronic device structures and microelectronic devices (e.g., the microelectronic device 100 (FIG. 1)) in accordance with embodiments of the disclosure may be used in embodiments of electronic systems of the disclosure. For example, FIG. 2 is a block diagram of an illustrative electronic system 300 according to embodiments of disclosure. The electronic system 300 may comprise, for example, a computer or computer hardware component, a server or other networking hardware component, a cellular telephone, a digital camera, a personal digital assistant (PDA), portable media (e.g., music) player, a Wi-Fi or cellular-enabled tablet such as, for example, an iPad® or SURFACE® tablet, an electronic book, a navigation device, etc. The electronic system 300 includes at least one memory device 302. The memory device 302 may comprise, for example, an embodiment of a microelectronic device (e.g., the microelectronic device 100 (FIG. 1)) previously described herein. The electronic system 300 may further include at least one electronic signal processor device 304 (often referred to as a "microprocessor"). The electronic signal processor device 304 may, optionally, include an embodiment of a microelectronic device (e.g., the microelectronic device 100 (FIG. 1)) previously described herein. While the memory device 302 and the electronic signal processor device 304 are depicted as two (2) separate devices in FIG. 2, in additional embodiments, a single (e.g., only one) memory/processor device having the functionalities of the memory device 302 and the electronic signal processor device 304 is included in the electronic system 300. In such embodiments, the memory/processor device may include a microelectronic device (e.g., the microelectronic device 100 (FIG. 1)) previously described herein. The electronic system 300 may further include one or more input devices 306 for inputting information into the electronic system 300 by a user, such as, for example, a mouse or other pointing device, a keyboard, a touchpad, a button, or a control panel. The electronic system 300 may further include one or more output devices 308 for outputting information (e.g., visual or audio output) to a user such as, for example, a monitor, a display, a printer, an audio output jack, a speaker, etc. In some embodiments, the input device 306 and the output device 308 may comprise a single touchscreen device that can be used both to input information to the electronic system 300 and to output visual information to a user. The input device 306 and the output device 308 may communicate electrically with one or more of the memory device 302 and the electronic signal processor device 304.

Thus, an electronic system according to embodiments of the disclosure includes an input device, an output device, a processor device operably coupled to the input device and the output device, and a memory device operably coupled to the processor device. The memory device includes a stack structure, a source structure, digit lines, strings of memory cells, control logic circuitry, semiconductor material, conductive pad structures, and conductive contact structures. The stack structure includes conductive structures vertically interleaved with insulative structures. The source structure underlies the stack structure. The digit lines overlie the stack structure. The strings of memory cells vertically extend through the stack structure and are in electrical communication with the source structure and the digit lines. The control logic circuitry overlies and is in electrical communication with the strings of memory cells. The semiconductor material at least partially overlies the control logic circuitry. The conductive pad structures overlie the semiconductor material. The conductive contact structures are in electrical communication with the conductive pad structures and the control logic circuitry. The conductive contact structures vertically extend from the conductive pad structures, through the semiconductor material, and to the control logic circuitry.

The devices, structures, and methods of the disclosure advantageously facilitate one or more of improved microelectronic device performance, reduced costs (e.g., manufacturing costs, material costs), increased miniaturization of components, and greater packaging density as compared to conventional devices, conventional structures, and conventional methods. The devices, structures, and methods of the disclosure may also improve scalability, efficiency, and simplicity as compared to conventional devices, conventional structures, and conventional methods.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A microelectronic device, comprising:
a memory array region comprising:
a stack structure comprising vertically alternating conductive structures and insulating structures;
vertically extending strings of memory cells within the stack structure;
at least one source structure vertically underlying the stack structure and coupled to the vertically extending strings of memory cells; and
digit line structures vertically overlying the stack structure and coupled to the vertically extending strings of memory cells;
a control logic region overlying the memory array region comprising;
control logic devices partially vertically underlying a base semiconductor structure, the control logic devices configured to effectuate control operations for the vertically extending strings of memory cells;
dielectric-filled trenches vertically extending into portions of the base semiconductor structure from a lowermost boundary of the base semiconductor structure; and
conductive contact structures vertically extending through the base semiconductor structure and entirely through some of the dielectric-filled trenches; and
a pad region overlying the control logic region and comprising conductive pad structures coupled to at least some of the control logic devices.

2. The microelectronic device of claim 1, wherein the control logic region comprises:
the control logic devices individually including control logic circuitry comprising:
transistors partially vertically underlying the base semiconductor structure; and
conductive routing structures vertically underlying and coupled to the transistors; and
the conductive contact structures coupled to the conductive pad structures and to the conductive routing structures of the control logic circuitry of the at least some of the control logic devices.

3. The microelectronic device of claim 2, wherein the conductive pad structures individually horizontally overlap at least some of the transistors of the control logic circuitry of the at least some of the control logic devices.

4. The microelectronic device of claim 1, wherein the control logic region further comprises some of the dielectric-filled trenches horizontally interposed between horizontally neighboring pairs of transistors of a control logic circuitry of the at least some of the control logic devices.

5. The microelectronic device of claim 1, wherein upper surfaces of the conductive contact structures vertically overlie an upper surface of the base semiconductor structure.

6. The microelectronic device of claim 5, wherein lower surfaces of the conductive pad structures physically contact the upper surfaces of the conductive contact structures and vertically overlie the upper surface of the base semiconductor structure.

7. The microelectronic device of claim 1, wherein the conductive pad structures individually have at least one of the conductive contact structures in physical contact therewith.

8. The microelectronic device of claim 1, wherein the conductive pad structures individually horizontally overlap the stack structure.

9. The microelectronic device of claim 8, wherein the conductive contact structures individually horizontally overlap the stack structure.

10. The microelectronic device of claim 1, further comprising an interconnect region vertically interposed between the memory array region and the control logic region, the interconnect region comprising structures coupling the digit line structures of the memory array region to the control logic devices of the control logic region.

11. The microelectronic device of claim 10, wherein the structures comprise:
digit line contact structures vertically overlying and coupled to the digit line structures;
additional conductive pad structures vertically overlying and coupled to the digit line contact structures; and
conductive routing structures vertically interposed between the additional conductive pad structures and the control logic devices of the control logic region, at least some of the conductive routing structures coupled to at least some of the additional conductive pad structures and one or more of the control logic devices.

12. The microelectronic device of claim 10, wherein the memory array region further comprises deep contact structures within a horizontal area of the stack structure and vertically extending completely through the stack structure, the deep contact structures coupled to the at least one source structure of the memory array region and to some of the structures of the interconnect region.

13. The microelectronic device of claim 12, wherein the memory array region further comprises additional deep contact structures outside of the horizontal area of the stack structure and vertically extending across an entire vertical height of the stack structure, the additional deep contact structures coupled to the at least one source structure of the memory array region and to some others of the structures of the interconnect region.

14. The microelectronic device of claim 1, wherein at least one of the conductive contact structures is individually at least partially positioned within a horizontal area of the vertically extending strings of memory cells of the memory array region.

15. A memory device, comprising:
a memory array region comprising:
a stack structure comprising tiers each including conductive material and insulative material vertically neighboring the conductive material;
strings of memory cells extending through the stack structure;
one or more source structures underlying the stack structure and coupled to the strings of memory cells; and
data line structures overlying the stack structure and coupled to the strings of memory cells;
an interconnect region overlying the memory array region and comprising:
conductive pad structures overlying and coupled to the data line structures; and
conductive routing structures overlying and coupled to the conductive pad structures;
a control logic region overlying the interconnect region and comprising:
dielectric-filled trenches vertically extending at least partially through a base semiconductor structure;
conductive contact structures extending completely through the base semiconductor structure and the dielectric-filled trenches; and
complementary metal-oxide-semiconductor (CMOS) circuitry at least partially underlying the base semiconductor structure and coupled to the conductive contact structures; and
a pad region overlying the control logic region and comprising additional conductive pad structures coupled to the conductive contact structures.

16. The memory device of claim 15, wherein the conductive contact structures comprise conductively filled vias vertically extending from the additional conductive pad structures, through semiconductor material of the base semiconductor structure, through isolation material underlying the base semiconductor structure, and to additional conductive routing structures of the CMOS circuitry.

17. The memory device of claim 15, wherein the base semiconductor structure comprises a silicon wafer.

18. The memory device of claim 15, wherein additional conductive pad structures and the conductive contact structures are individually at least partially positioned within a horizontal area of the CMOS circuitry.

19. The memory device of claim 15, wherein additional conductive pad structures and the conductive contact structures are individually at least partially positioned within a horizontal area of the stack structure.

20. The memory device of claim 15, wherein:
upper surfaces of the conductive contact structures vertically overlie an upper surface of the base semiconductor structure; and
lower surfaces of the additional conductive pad structures are vertically offset from the upper surface of the base semiconductor structure by a vertical height of portions of the conductive contact structures vertically overlying the upper surface of the base semiconductor structure.

21. The memory device of claim 15, wherein:
the base semiconductor structure has a non-planar lower boundary and a substantially planar upper boundary; and
transistors of the CMOS circuitry are vertically positioned along the non-planar lower boundary of the base semiconductor structure.

22. The memory device of claim 21, wherein the transistors of the CMOS circuitry individually comprise:
two conductively doped regions of the base semiconductor structure;
a channel region within the base semiconductor structure and horizontally interposed between the two conductively doped regions of the base semiconductor structure;
a gate electrode vertically underlying and horizontally overlapping the channel region; and
a gate dielectric material vertically interposed between and horizontally overlapping the channel region and the gate electrode.

23. The memory device of claim 21, wherein the conductive contact structures are individually horizontally positioned between horizontally neighboring pairs of the transistors of the CMOS circuitry.

24. An electronic system, comprising:
an input device;
an output device;
a processor device operably coupled to the input device and the output device; and
a memory device operably coupled to the processor device and comprising:
a stack structure comprising conductive structures vertically interleaved with insulative structures;
a source structure underlying the stack structure;
digit lines overlying the stack structure;
strings of memory cells vertically extending through the stack structure and in electrical communication with the source structure and the digit lines;
control logic circuitry overlying and in electrical communication with the strings of memory cells;
semiconductor material at least partially overlying the control logic circuitry;
conductive pad structures overlying the semiconductor material; and
conductive contact structures in electrical communication with the conductive pad structures and the control logic circuitry, the conductive contact structures vertically extending from the conductive pad structures, through the semiconductor material, and to the control logic circuitry, some of the conductive contact structures at least partially positioned within horizontal areas of some of the strings of memory cells.

25. The electronic system of claim 24, wherein the memory device comprises a 3D NAND Flash memory device.

\* \* \* \* \*